US012152116B2

(12) United States Patent
Sasada

(10) Patent No.: US 12,152,116 B2
(45) Date of Patent: Nov. 26, 2024

(54) POLYMER FILM AND LAMINATE

(71) Applicant: FUJIFILM Corporation, Tokyo (JP)

(72) Inventor: Yasuyuki Sasada, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/365,191

(22) Filed: Aug. 3, 2023

(65) Prior Publication Data

US 2023/0383076 A1   Nov. 30, 2023

Related U.S. Application Data

(63) Continuation of application No. PCT/JP2022/013084, filed on Mar. 22, 2022.

(30) Foreign Application Priority Data

Mar. 22, 2021 (JP) ................................ 2021-047289

(51) Int. Cl.
| | | |
|---|---|---|
| C08J 5/18 | (2006.01) | |
| B32B 5/18 | (2006.01) | |
| B32B 15/04 | (2006.01) | |
| B32B 15/20 | (2006.01) | |
| C08K 3/28 | (2006.01) | |
| C08K 3/36 | (2006.01) | |
| C08K 3/38 | (2006.01) | |
| C08K 7/02 | (2006.01) | |

(52) U.S. Cl.
CPC ............... *C08J 5/18* (2013.01); *B32B 5/18* (2013.01); *B32B 15/046* (2013.01); *B32B 15/20* (2013.01); *B32B 2260/02* (2013.01); *B32B 2260/046* (2013.01); *B32B 2307/54* (2013.01); *B32B 2307/748* (2013.01); *C08J 2381/06* (2013.01); *C08J 2467/02* (2013.01); *C08K 2003/282* (2013.01); *C08K 3/36* (2013.01); *C08K 2003/385* (2013.01); *C08K 7/02* (2013.01)

(58) Field of Classification Search
None
See application file for complete search history.

(56) References Cited

U.S. PATENT DOCUMENTS

| | | |
|---|---|---|
| 2018/0298186 A1 | 10/2018 | Yoshihara et al. |
| 2020/0216648 A1* | 7/2020 | Kato .................. C08L 77/00 |
| 2022/0041932 A1 | 2/2022 | Imamura et al. |

FOREIGN PATENT DOCUMENTS

| | | |
|---|---|---|
| EP | 0465251 | 1/1992 |
| JP | H04226566 | 8/1992 |
| JP | 2003147211 | 5/2003 |
| JP | 2012153845 | 8/2012 |
| JP | 2016102153 | 6/2016 |
| WO | 2017111115 | 6/2017 |
| WO | 2020218405 | 10/2020 |

OTHER PUBLICATIONS

JP 2012-153845 Machine Translation via EPO (Year: 2012).*
"Ullmann's Polymers and Plastics—Products and Processes, 4 Volume Set—40.4.7.1 Compounds of Starch and Biodegradable Polyesters" (Wiley-VCH, 2016, pp. 1231-1259, John Wiley & Sons; https://app.knovel.com/hotlink/pdf/id:kt011CB5V2/ullmanns-polymers-plastics/compounds-starch-biodegradable) (Year: 2016).*
Mechanical Engineers' Handbook, vol. 1—Materials and Engineering Mechanics (4th Edition)—9.6.4 Liquid Crystalline Polyesters ( Kutz, Myer, 2015, pp. 386 John Wiley & Sons; https://app.knovel.com/hotlink/pdf/id:kt011UOFZB/mechanical-engineers/liquid-crystalline-polyesters) (Year: 2015).*
"International Search Report (Form PCT/ISA/210) of PCT/JP2022/013084", mailed on Jun. 14, 2022, with English translation thereof, pp. 1-5.
"Written Opinion of the International Searching Authority (Form PCT/ISA/237) of PCT/JP2022/013084", mailed on Jun. 14, 2022, with English translation thereof, pp. 1-8.

* cited by examiner

*Primary Examiner* — Laura C Powers
(74) *Attorney, Agent, or Firm* — JCIPRNET

(57) ABSTRACT

Provided are a polymer film containing a polymer and a filler, in which the polymer film has a phase-separated structure including at least two phases, and all of the at least two phases have an elastic modulus of 0.01 GPa or more; and an application thereof.

16 Claims, No Drawings

POLYMER FILM AND LAMINATE

CROSS-REFERENCE TO RELATED APPLICATION

This application is a Continuation of International Application No. PCT/JP2022/013084, filed Mar. 22, 2022, which claims priority to Japanese Patent Application No. 2021-047289 filed Mar. 22, 2021. Each of the above applications is hereby expressly incorporated by reference, in its entirety, into the present application.

BACKGROUND OF THE INVENTION

1. Field of the Invention

The present disclosure relates to a polymer film and a laminate.

2. Description of the Related Art

In recent years, a polymer film has been applied to various fields, and performance such as thermal conductivity and low dielectricity is required depending on the application.

As the polymer film, for example, JP2016-102153A discloses a multi-phase polymer material (specifically, a conductive film) containing a filler, in which the multi-phase polymer material has a co-continuous structure including at least a first phase and a second phase, each having different properties, and the filler is dispersed in the co-continuous structure so that it is unevenly distributed in a specific phase.

SUMMARY OF THE INVENTION

In some cases, the polymer film is required to have improved toughness.

The present disclosure has been made in view of such circumstances, and according to an embodiment of the present disclosure, a polymer film having high toughness is provided.

In addition, according to another embodiment of the present disclosure, a laminate using the polymer film is provided.

The present disclosure includes the following aspects.

<1> A polymer film comprising:
a polymer; and
a filler,
in which the polymer film has a phase-separated structure including at least two phases, and all of the at least two phases have an elastic modulus of 0.01 GPa or more.

<2> The polymer film according to <1>,
in which the phase-separated structure is a co-continuous structure, a cylinder structure, or a lamella structure.

<3> The polymer film according to <1> or <2>,
in which the phase-separated structure includes two phases, and
in a case where a volume of a filler present in one phase is a and a volume of a filler present in the other phase is b, a/b, which is an abundance ratio of the fillers, is 100/0 to 60/40.

<4> The polymer film according to any one of <1> to <3>,
in which a content of a filler contained in any of the at least two phases is 20% by volume or more with respect to a total volume of the phase.

<5> The polymer film according to any one of <1> to <4>,
in which at least one phase of the at least two phases has an elastic modulus of 0.1 GPa or more.

<6> The polymer film according to any one of <1> to <5>,
in which the polymer includes at least one selected from the group consisting of a liquid crystal polymer and polysulfone.

<7> The polymer film according to <6>,
in which the liquid crystal polymer includes a constitutional unit represented by any of Formulae (1) to (3),

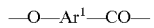  Formula (1)

  Formula (2)

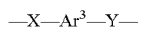  Formula (3)

in Formulae (1) to (3), $Ar^1$ represents a phenylene group, a naphthylene group, or a biphenylylene group, $Ar^2$ and $Ar^3$ each independently represent a phenylene group, a naphthylene group, a biphenylylene group, or a group represented by Formula (4), X and Y each independently represent an oxygen atom or an imino group, and hydrogen atoms in the group represented by $Ar^1$ to $Ar^3$ may be each independently substituted with a halogen atom, an alkyl group, or an aryl group,

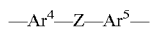  Formula (4)

in Formula (4), $Ar^4$ and $Ar^5$ each independently represent a phenylene group or a naphthylene group, and Z represents an oxygen atom, a sulfur atom, a carbonyl group, a sulfonyl group, or an alkylene group.

<8> The polymer film according to any one of <1> to <7>,
in which a thermal conductivity is 1 W/(m·K) or more.

<9> The polymer film according to any one of <1> to <8>,
in which the filler is at least one selected from the group consisting of boron nitride, aluminum nitride, graphite, silicon carbide, silica, alumina, and beryllium oxide.

<10> The polymer film according to any one of <1> to <9>,
in which the filler has a dielectric loss tangent of 0.01 or less.

<11> The polymer film according to <10>,
in which the filler is liquid crystal polymer particles, fluororesin particles, or an inorganic material.

<12> The polymer film according to <11>,
in which the inorganic material includes metal oxide particles.

<13> The polymer film according to <11> or <12>,
in which the inorganic material includes fiber.

<14> The polymer film according to any one of <1> to <13>,
in which at least one phase of the at least two phases contains a polymer having a dielectric loss tangent of 0.01 or less.

<15> A laminate comprising:
the polymer film according to any one of <1> to <14>; and
a metal layer or a metal wire, disposed on at least one surface of the polymer film.

<16> The laminate according to <15>,
in which the laminate includes the metal layer, and
a peel strength between the polymer film and the metal layer is 0.5 kN/m or more.

According to the embodiment of the present disclosure, it is possible to provide a polymer film having high toughness.

In addition, according to another embodiment of the present disclosure, it is possible to provide a laminate using the polymer film.

DESCRIPTION OF THE PREFERRED EMBODIMENTS

Hereinafter, the contents of the present disclosure will be described in detail. The description of configuration requirements below is made based on representative embodiments of the present disclosure in some cases, but the present disclosure is not limited to such embodiments.

Further, in the present specification, a numerical range shown using "to" indicates a range including numerical values described before and after "to" as a lower limit value and an upper limit value.

In a numerical range described in a stepwise manner in the present disclosure, an upper limit or a lower limit described in one numerical range may be replaced with an upper limit value or a lower limit value in another numerical range described in a stepwise manner. Further, in a numerical range described in the present disclosure, an upper limit value or a lower limit value described in the numerical range may be replaced with a value described in an example.

Further, in a case where substitution or unsubstitution is not noted in regard to the notation of a "group" (atomic group) in the present specification, the "group" includes not only a group that does not have a substituent but also a group having a substituent. For example, the concept of an "alkyl group" includes not only an alkyl group that does not have a substituent (unsubstituted alkyl group) but also an alkyl group having a substituent (substituted alkyl group).

Further, the term "step" in the present specification indicates not only an independent step but also a step which cannot be clearly distinguished from other steps as long as the intended purpose of the step is achieved. Further, in the present disclosure, "% by mass" has the same definition as that for "% by weight", and "part by mass" has the same definition as that for "part by weight".

Furthermore, in the present disclosure, a combination of two or more preferred embodiments is a more preferred embodiment.

In addition, the weight-average molecular weight (Mw) and the number-average molecular weight (Mn) in the present disclosure are molecular weights in terms of polystyrene used as a standard substance, which are detected by using a solvent tetrahydrofuran (THF), a differential refractometer, and a gel permeation chromatography (GPC) analyzer using TSKgel GMHxL, TSKgel G4000HxL, and TSKgel G2000HxL (all trade names manufactured by Tosoh Corporation) as columns, unless otherwise specified.

Hereinafter, the present disclosure will be described in detail.

(Polymer Film)

The polymer film according to the embodiment of the present disclosure contains a polymer and a filler, in which the polymer film has a phase-separated structure including at least two phases, and all of the at least two phases have an elastic modulus of 0.01 GPa or more.

The present inventors have found that toughness of the polymer film in the related art is not sufficient.

As a result of intensive research conducted by the present inventor, it has been found that, with the above-described configuration, it is possible to provide a polymer film having high toughness.

In particular, in the polymer film according to the embodiment of the present disclosure, since all of the at least two phases have an elastic modulus of 0.01 GPa or more, the toughness is higher than that in the related art. In addition, since the polymer film according to the embodiment of the present disclosure has the phase-separated structure, it is possible to increase a content of the filler.

On the other hand, in the multi-phase polymer material disclosed in JP2016-102153A, since one phase contains a styrene-butadiene rubber (SBR), a styrene-ethylene/butylene-styrene copolymer (SEBS), or the like, the toughness is insufficient.

<Phase-Separated Structure>

The polymer film according to the embodiment of the present disclosure has a phase-separated structure including at least two phases. In the present disclosure, the "phase-separated structure" means a structure in which at least two portions containing components different from each other are present in the polymer film. The film having a phase-separated structure is preferably formed by changing a single phase into two or more distinguishable phases in a manufacturing process. Examples thereof in solution film forming include an aspect in which the film having a phase-separated structure is formed from a homogeneous solution, and an aspect in which the film having a phase-separated structure is formed by applying energy such as heat and pressure to a homogeneous film.

Examples of the phase-separated structure include a sea-island structure, a co-continuous structure, a cylinder structure, and a lamella structure. The sea-island structure means a structure in which one phase of the at least two phases forms a continuous phase and the other phase is dispersed in a discontinuous manner. In addition, the co-continuous structure means a structure in which all of the at least two phases form a continuous phase. The cylinder structure means a structure having, in at least one phase of the at least two phases, a plurality of rod-like phases which are other phases. The lamella structure means a layered structure in which the at least two phases are alternately overlapped. Both the cylinder structure and the lamella structure are structures in which all of the at least two phases form a continuous phase, but they are distinguished from the co-continuous structure in that they have the above-described characteristics (rod-like or layered).

It is preferable that the polymer film according to the embodiment of the present disclosure has a phase-separated structure in which all of the at least two phases form a continuous phase. Specifically, the phase-separated structure in the polymer film according to the embodiment of the present disclosure is preferably the co-continuous structure, the cylinder structure, or the lamella structure.

The formation of the phase-separated structure can be confirmed by using morphological observation with respect to a surface of the film, a cross section of the film, or both the surface of the film and the cross section of the film. In a case where the confirmation cannot be performed by the morphological observation, the confirmation can be performed by using a unit for evaluating material distribution. In a case where the confirmation cannot be performed by the evaluation of the material distribution, the confirmation can be performed by using a unit for evaluating mechanical property distribution. The morphological observation can be performed with a known optical microscope. In a case where the confirmation cannot be performed with the optical microscope, the confirmation can be performed with an electron microscope or the like. Infrared spectroscopy can be used for the evaluation of the material distribution. In a case where the infrared spectroscopy cannot be used, Raman spectroscopy can be used. In a case where the confirmation cannot be performed by the Raman spectroscopy, imaging can be performed using an X-ray photoelectron spectroscopy or the like. The evaluation of the mechanical property distribution can be performed using an atomic force microscope.

<Filler>

The polymer film according to the embodiment of the present disclosure contains a filler. The polymer film may contain only one or two or more kinds of the fillers. In addition, the filler may be contained in only a part of the at least two phases, or may be contained in all the phases.

The filler may be in a form of particles (for example, inorganic particles), or in a form of fibers (for example, inorganic fiber). In addition, the filler may be an inorganic filler or an organic filler. The filler may have any of low dielectric loss tangent, low dielectric constant, high dielectric constant, high thermal conductivity, high hardness, or high elastic modulus, and may have any of electrical insulation, semi-conductivity, or conductivity. For example, in a case of an electrically insulating filler, a volume resistivity of the filler is preferably $1.0 \times 10^{11}$ Ω·cm or more, more preferably $3.0 \times 10^{11}$ Ω·cm or more, and particularly preferably $1.0 \times 10^{12}$ Ω·cm or more. In addition, the upper limit value of the volume resistivity is not particularly limited, but is $1.0 \times 10^{18}$ Ω·cm for practical use.

On the other hand, in a case of a semi-conductive filler or a conductive filler, a volume resistivity of the filler is not particularly limited, but is $1.0 \times 10^{7}$ Ω·cm or more for practical use. In addition, the volume resistivity is preferably less than $1.0 \times 10^{11}$ Ω·cm.

A thermal diffusivity of the filler is, for example, $1.0 \times 10^{-6}$ $m^2$ $s^{-1}$ or more, preferably $2.0 \times 10^{-6}$ $m^2$ $s^{-1}$ or more and particularly preferably $3.0 \times 10^{-6}$ $m^2$ $s^{-1}$ or more. In addition, the upper limit value of the thermal diffusivity of the filler is not particularly limited, but is $1.0 \times 10^{-4}$ $m^2$ $s^{-1}$ for practical use.

A density of the filler is, for example, 4.0 $g/cm^3$ or less, preferably 3.0 $g/cm^3$ or less. In addition, the lower limit value of the density of the filler is not particularly limited, but is 1.0 $g/cm^3$ for practical use. In a case where the filler is one having a void portion or a cavity portion, such as porous bodies and hollow particles, the density of the filler in the present specification means the density of the solid content constituting the filler.

As the inorganic filler, a known inorganic filler can be used.

Examples of a material of the inorganic filler include a metal oxide, a metal hydroxide, a metal carbonate, a metal nitride, a silicon compound, a boron compound, a carbon compound, and a composite compound thereof. Specific examples of the material of the inorganic filler include boron nitride, aluminum nitride, silicon nitride, titanium oxide, magnesium oxide, zinc oxide, copper oxide, cuprous oxide, silica, alumina, beryllium oxide, barium titanate, strontium titanate, aluminum hydroxide, calcium carbonate, graphite, silicon carbide, titanium boride, diamond, and mineral ceramics such as magnesite (magnesium carbonate), perovskite (calcium titanate), talc, mica, kaolin, bentonite, and pyrophyllite. In a case where these inorganic fillers have two or more kinds of crystal forms, any of these can be used.

In addition, the inorganic filler may be glass fiber, carbon fiber (pitch-based or PAN-based), carbon nanotube (CNT), carbon nanofiber (CNF), rock fiber, slug fiber, or metal fiber.

As the organic filler, a known organic filler can be used.

Examples of a material of the organic filler include a liquid crystal polymer, polyethylene, polystyrene, urea-formalin filler, polyester, cellulose, acrylic resin, fluororesin, cured epoxy resin, crosslinked benzoguanamine resin, and crosslinked acrylic resin.

In addition, the organic filler may be nanofiber cellulose.

In a case where the polymer film is used as a thermally conductive film, from the viewpoint of improving thermal conductivity, it is preferable that the filler is at least one selected from the group consisting of boron nitride, aluminum nitride, graphite, silicon carbide, silica, alumina, and beryllium oxide.

The filler may have a configuration in which semi-conductive or conductive thermally conductive particles are coated or surface-treated with an electrically insulating material such as silica. According to such an aspect, since it is easy to individually control the thermal conductivity and the electrical insulation, it is easy to adjust the thermal conductivity and the electrical insulation. Examples of a method of forming silica on the surface include a water glass method and a sol-gel method.

These fillers may be used alone or in combination of two or more thereof. In addition, a shape of the filler is not particularly limited, and examples thereof include a fibrous shape, a plate shape, a scaly shape, a rod shape, a spherical shape, a tube shape, a curved plate shape, and a needle shape.

The filler may be subjected to a surface treatment such as a silane coupling treatment, a titanate coupling treatment, an epoxy treatment, a urethane treatment, and an oxidation treatment. Examples of a surface treatment agent used for the surface treatment include polyol, aluminum oxide, aluminum hydroxide, silica (silicon oxide), hydrous silica, alkanolamine, stearic acid, organosiloxane, zirconium oxide, hydrogen dimethicone, a silane coupling agent, and a titanate coupling agent. Among these, the surface treatment agent is preferably a silane coupling agent.

An average primary particle diameter of the filler is preferably 0.0130 μm to 30 μm. The lower limit value of the average primary particle diameter of the filler is more preferably 0.05 μm, still more preferably 0.1 μm, and particularly preferably 0.3 μm. In addition, the upper limit value of the average primary particle diameter of the filler is more preferably 20 μm, still more preferably 15 μm, and particularly preferably 10 μm. In addition, the filler may contain a granular mixture in which at least two types of particle groups having different average primary particle diameters are mixed. With such a configuration, as compared with a case where small particles are embedded between large particles and only single-diameter fillers are included, spacing between the fillers is reduced and the number of contact points is increased. In this case, a ratio of a peak particle diameter (a ratio of particle diameters corresponding to peak apexes) is preferably 1.5 to 50. The lower limit value of the ratio of the peak particle diameter is preferably 2 and more preferably 4. The upper limit value of the ratio of the peak particle diameter is preferably 40 and more preferably 20.

In a case where the polymer film is used as a low dielectric film, a dielectric loss tangent of the filler is preferably 0.01 or less, and more preferably 0.005 or less. The lower limit value of the dielectric loss tangent is not particularly limited, but is, for example, 0.002. Specifically, it is preferable that the filler is liquid crystal polymer particles, fluororesin particles, or an inorganic material. From the viewpoint of reducing the dielectric loss tangent, the inorganic material preferably includes metal oxide particles. In addition, from the viewpoint of reducing the dielectric loss tangent, the inorganic material preferably includes fiber.

From the viewpoint of improving the toughness, an average particle diameter of the inorganic filler is preferably 5 nm to 20 µm, more preferably 10 nm to 1 µm, still more preferably 20 nm to 500 nm, and particularly preferably 25 nm to 90 nm.

—Abundance Ratio—

In the polymer film according to the embodiment of the present disclosure, the phase-separated structure includes two phases, and in a case where a volume of a filler present in one phase is a and a volume of a filler present in the other phase is b, a/b, which is an abundance ratio of the fillers, is preferably 100/0 to 60/40, more preferably 100/0 to 70/30, and particularly preferably 100/0. That is, it is particularly preferable that only one of the two phases contains the filler.

—Content—

In the polymer film according to the embodiment of the present disclosure, from the viewpoint of improving electrical characteristics and thermal conductivity, a content of a filler contained in any of the at least two phases is preferably 20% by volume or more, and more preferably 30% by volume or more with respect to a total volume of the phase. The upper limit value of the content of the filler contained in the phase is not particularly limited, and is, for example, 80% by volume.

<Polymer>

The polymer film according to the embodiment of the present disclosure contains a polymer. The polymer film may contain only one or two or more kinds of the polymers. In addition, the polymer may be contained in only a part of the at least two phases, or may be contained in all the phases.

The type of the polymer is not particularly limited, and a known polymer can be used.

Examples of the polymer include a liquid crystal polymer, polyester, polycarbonate, an acrylic resin, polystyrene, polyolefin, polyamide, polyimide, polysulfone, polyethersulfone, polyether ether ketone, polyphenylene sulfide, polyvinyl alcohol, polyvinylidene chloride, an epoxy resin, and a fluororesin.

Among these, from the viewpoint of improving the toughness, it is preferable that the polymer includes at least one selected from the group consisting of a liquid crystal polymer and polysulfone.

In a case the polymer film has a phase-separated structure including two phase, examples of the polymer film include an aspect in which both phases contain a liquid crystal polymer; an aspect in which both phases contain polysulfone; and an aspect in which one phase contains a liquid crystal polymer and the other phase contains polysulfone.

Among these, from the viewpoint of improving the toughness, an aspect in which one phase contains a liquid crystal polymer and the other phase contains polysulfone is preferable.

—Liquid Crystal Polymer—

The type of the liquid crystal polymer is not particularly limited, and a known liquid crystal polymer can be used.

In addition, the liquid crystal polymer may be a thermotropic liquid crystal polymer which exhibits liquid crystallinity in a molten state, or may be a lyotropic liquid crystal polymer which exhibits liquid crystallinity in a solution state. In addition, in a case of the thermotropic liquid crystal, it is preferable that the liquid crystal is melted at a temperature of 450° C. or lower.

Examples of the liquid crystal polymer include a liquid crystal polyester, a liquid crystal polyester amide in which an amide bond is introduced into the liquid crystal polyester, a liquid crystal polyester ether in which an ether bond is introduced into the liquid crystal polyester, and a liquid crystal polyester carbonate in which a carbonate bond is introduced into the liquid crystal polyester.

In addition, as the liquid crystal polymer, from the viewpoint of liquid crystallinity, a polymer having an aromatic ring is preferable, an aromatic polyester or an aromatic polyester amide is more preferable, and an aromatic polyester amide is still more preferable.

Further, the liquid crystal polymer may be a polymer in which an imide bond, a carbodiimide bond, a bond derived from an isocyanate, such as an isocyanurate bond, or the like is further introduced into the aromatic polyester or the aromatic polyester amide.

Further, it is preferable that the liquid crystal polymer is a wholly aromatic liquid crystal polymer formed of only an aromatic compound as a raw material monomer.

Examples of the liquid crystal polymer include:
1) a liquid crystal polymer obtained by polycondensing (i) an aromatic hydroxycarboxylic acid, (ii) an aromatic dicarboxylic acid, and (iii) at least one compound selected from the group consisting of an aromatic diol, an aromatic hydroxyamine, and an aromatic diamine;
2) a liquid crystal polymer obtained by polycondensing a plurality of types of aromatic hydroxycarboxylic acids;
3) a liquid crystal polymer obtained by polycondensing (i) an aromatic dicarboxylic acid and (ii) at least one compound selected from the group consisting of an aromatic diol, an aromatic hydroxyamine, and an aromatic diamine; and
4) a liquid crystal polymer obtained by polycondensing (i) polyester such as polyethylene terephthalate and (ii) an aromatic hydroxycarboxylic acid.

Here, as a part or entire of the aromatic hydroxycarboxylic acid, the aromatic dicarboxylic acid, the aromatic diol, the aromatic hydroxyamine, and the aromatic diamine, each independently, a derivative which can be polycondensed may be used.

Examples of a polymerizable derivative of a compound having a carboxy group, such as an aromatic hydroxycarboxylic acid and an aromatic dicarboxylic acid, include a derivative (ester) obtained by converting a carboxy group to an alkoxycarbonyl group or an aryloxycarbonyl group, a derivative (acid halide) obtained by converting a carboxy group to a haloformyl group, and a derivative (acid anhydride) obtained by converting a carboxy group to an acyloxycarbonyl group.

Examples of a polymerizable derivative of a compound having a hydroxy group, such as an aromatic hydroxycarboxylic acid, an aromatic diol, and an aromatic hydroxyamine, include a derivative (acylated product) obtained by acylating a hydroxy group and converting the acylated group into an acyloxy group.

Examples of a polymerizable derivative of a compound having an amino group, such as an aromatic hydroxyamine or an aromatic diamine, include a derivative (acylated product) obtained by acylating an amino group and converting the acylated group to an acylamino group.

From the viewpoint of liquid crystallinity, the liquid crystal polymer preferably has a constitutional unit represented by any of Formulae (1) to (3) (hereinafter, a constitutional unit represented by Formula (1) or the like may be referred to as an unit (1) or the like), more preferably has a constitutional unit represented by Formula (1), and particularly preferably has a constitutional unit represented by Formula (1), a constitutional unit represented by Formula (2), and a constitutional unit represented by Formula (3).

$$—O—Ar^1—CO—\quad\text{Formula (1)}$$

$$—CO—Ar^2—CO—\quad\text{Formula (2)}$$

$$—X—Ar^3—Y—\quad\text{Formula (3)}$$

In Formulae (1) to (3), $Ar^1$ represents a phenylene group, a naphthylene group, or a biphenylylene group, $Ar^2$ and $Ar^3$ each independently represent a phenylene group, a naphthylene group, a biphenylylene group, or a group represented by Formula (4), X and Y each independently represent an oxygen atom or an imino group, and hydrogen atoms in the group represented by $Ar^1$ to $Ar^3$ may be each independently substituted with a halogen atom, an alkyl group, or an aryl group.

$$—Ar^4—Z—Ar^5—\quad\text{Formula (4)}$$

In Formula (4), $Ar^4$ and $Ar^5$ each independently represent a phenylene group or a naphthylene group, and Z represents an oxygen atom, a sulfur atom, a carbonyl group, a sulfonyl group, or an alkylene group.

Examples of the halogen atom include a fluorine atom, a chlorine atom, a bromine atom, and an iodine atom.

Examples of the alkyl group include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, and an n-decyl group, and the number of carbon atoms thereof is preferably 1 to 10.

Examples of the aryl group include a phenyl group, an o-tolyl group, an m-tolyl group, a p-tolyl group, a 1-naphthyl group, and a 2-naphthyl group, and the number of carbon atoms thereof is preferably 6 to 20.

In a case where the hydrogen atom is substituted with any of these groups, the number thereof for each group independently represented by $Ar^1$, $Ar^2$, or $Ar^3$ is preferably 2 or less and more preferably 1.

Examples of the alkylene group include a methylene group, a 1,1-ethanediyl group, a 1-methyl-1,1-ethanediyl group, a 1,1-butanediyl group, and a 2-ethyl-1,1-hexanediyl group, and the number of carbon atoms thereof is preferably 1 to 10.

The unit (1) is a constitutional unit derived from a predetermined aromatic hydroxycarboxylic acid.

As the unit (1), an aspect in which $Ar^1$ represents a p-phenylene group (constitutional unit derived from p-hydroxybenzoic acid), an aspect in which $Ar^1$ represents a 2,6-naphthylene group (constitutional unit derived from 6-hydroxy-2-naphthoic acid), or an aspect in which $Ar^1$ represents a 4,4'-biphenylylene group (constitutional unit derived from 4'-hydroxy-4-biphenylcarboxylic acid) is preferable.

The unit (2) is a constitutional unit derived from a predetermined aromatic dicarboxylic acid.

As the unit (2), an aspect in which $Ar^2$ represents a p-phenylene group (constitutional unit derived from terephthalic acid), an aspect in which $Ar^2$ represents an m-phenylene group (constitutional unit derived from isophthalic acid), an aspect in which $Ar^2$ represents a 2,6-naphthylene group (constitutional unit derived from 2,6-naphthalenedicarboxylic acid), or an aspect in which $Ar^2$ represents a diphenylether-4,4'-diyl group (constitutional unit derived from diphenylether-4,4'-dicarboxylic acid) is preferable.

The unit (3) is a constitutional unit derived from a predetermined aromatic diol, aromatic hydroxylamine, or aromatic diamine.

As the unit (3), an aspect in which $Ar^3$ represents a p-phenylene group (constitutional unit derived from hydroquinone, p-aminophenol, or p-phenylenediamine), an aspect in which $Ar^3$ represents an m-phenylene group (constitutional unit derived from isophthalic acid), or an aspect in which $Ar^3$ represents a 4,4'-biphenylylene group (constitutional unit derived from 4,4'-dihydroxybiphenyl, 4-amino-4'-hydroxybiphenyl, or 4,4'-diaminobiphenyl) is preferable.

A content of the unit (1) is preferably 30% by mole or more, more preferably 30% to 80% by mole, still more preferably 30% to 60% by mole, and particularly preferably 30% to 40% by mole with respect to the total amount of all constitutional units (a value obtained by dividing the mass of each constitutional unit constituting the liquid crystal polymer by the formula weight of each constitutional unit to calculate an amount (mol) equivalent to the substance amount of each unit and adding up the amounts).

A content of the unit (2) is preferably 35% by mole or less, more preferably 10% by mole to 35% by mole, still more preferably 20% by mole to 35% by mole, and particularly preferably 30% by mole to 35% by mole with respect to the total amount of all constitutional units.

A content of the unit (3) is preferably 35% by mole or less, more preferably 10% by mole to 35% by mole, still more preferably 20% by mole to 35% by mole, and particularly preferably 30% by mole to 35% by mole with respect to the total amount of all constitutional units.

The heat resistance, the strength, and the rigidity are likely to be improved as the content of the unit (1) increases, but the solubility in a solvent is likely to be decreased in a case where the content thereof is extremely large.

In a case where a proportion of the content of the unit (2) to the content of the unit (3) is expressed as [content of unit (2)]/[content of unit (3)] (mol/mol), the proportion is preferably 0.9/1 to 1/0.9, more preferably 0.95/1 to 1/0.95, and still more preferably 0.98/1 to 1/0.98.

The liquid crystal polymer may have two or more kinds of each of the units (1) to (3) independently. In addition, the liquid crystal polymer may have a constitutional unit other than the units (1) to (3). A content of the constitutional unit other than the units (1) to (3) is preferably 10% by mole or less and more preferably 5% by mole or less with respect to the total amount of all units. The lower limit value of the above-described content thereof is not particularly limited, and may be 0% by mole.

Since the solubility in a solvent is excellent, the liquid crystal polymer preferably has a unit (3) in which at least one of X or Y is an imino group, that is, preferably has at least one of a constitutional unit derived from a predetermined aromatic hydroxylamine or a constitutional unit derived from an aromatic diamine, and it is more preferable to have only a unit (3) in which at least one of X or Y is an imino group.

It is preferable that the liquid crystal polymer is produced by melt-polymerizing raw material monomers corresponding to the constitutional units constituting the liquid crystal polymer. The melt polymerization may be carried out in the presence of a catalyst, examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as 4-(dimethylamino)pyridine and 1-methylimidazole, and nitrogen-containing heterocyclic compounds are preferably used. The melt polymerization may be further carried out by solid phase polymerization as necessary.

A flow start temperature of the liquid crystal polymer is preferably 250° C. or higher, more preferably 250° C. or higher and 350° C. or lower, and still more preferably 260° C. or higher and 330° C. or lower. In a case where the flow start temperature of the liquid crystal polymer is within the above-described range, the solubility, the heat resistance, the strength, and the rigidity are excellent, and the viscosity of the solution is appropriate.

The flow start temperature, also referred to as a flow temperature, is a temperature at which a viscosity of 4,800 Pa·s (48,000 poises) is exhibited in a case where the liquid crystal polymer is melted and extruded from a nozzle having an inner diameter of 1 mm and a length of 10 mm while the temperature is raised at a rate of 4° C./min under a load of 9.8 MPa (100 kg/cm$^2$) using a capillary rheometer and is a guideline for the molecular weight of the liquid crystal polymer (see p. 95 of "Liquid Crystal Polymers—Synthesis/Molding/Applications—", written by Naoyuki Koide, CMC Corporation, Jun. 5, 1987).

In addition, a weight-average molecular weight of the liquid crystal polymer is preferably 1,000,000 or less, more preferably 3,000 to 300,000, still more preferably 5,000 to 100,000, and particularly preferably 5,000 to 30,000. In a case where the weight-average molecular weight of the liquid crystal polymer is within the above-described range, a film after heat treatment is excellent in thermal conductivity, heat resistance, strength, and rigidity in the thickness direction.

A content of the polymer is preferably 20% by volume to 90% by volume, and more preferably 30% by volume to 80% by volume with respect to the total volume of the polymer film.

In a case where the polymer film is used as a low dielectric film, it is preferable that at least one phase of the at least two phases contains a polymer having a dielectric loss tangent of 0.01 or less. The dielectric loss tangent of the polymer is preferably 0.005 or less, more preferably 0.004 or less, still more preferably 0.0035 or less, and particularly preferably more than 0 and 0.003 or less.

Examples of the polymer having a dielectric loss tangent of 0.01 or less include thermoplastic resins such as a liquid crystal polymer, a fluorine-based polymer, a polymerized substance of a compound which has a cyclic aliphatic hydrocarbon group and a group having an ethylenically unsaturated bond, polyether ether ketone, polyolefin, polyamide, polyester, polyphenylene sulfide, polyether ketone, polycarbonate, polyethersulfone, polyphenylene ether and a modified product thereof, and polyetherimide; elastomers such as a copolymer of glycidyl methacrylate and polyethylene; and thermosetting resins such as a phenol resin, an epoxy resin, polyimide, and a cyanate resin.

Among these, from the viewpoint of reducing the dielectric loss tangent of the polymer film, the polymer is preferably at least one selected from the group consisting of a fluorine-based polymer, a polymerized substance of a compound which has a cyclic aliphatic hydrocarbon group and a group having an ethylenically unsaturated bond, and polyether ether ketone, and more preferably at least one selected from the group consisting of a liquid crystal polymer and a fluorine-based polymer. From the viewpoint of film-forming properties and mechanical strength, the polymer is particularly preferably a liquid crystal polymer, and from the viewpoint of dielectric loss tangent, the polymer is particularly preferably a fluorine-based polymer.

The dielectric loss tangent in the present disclosure is measured by the following method.

The dielectric loss tangent is measured by a resonance perturbation method at a frequency of 10 GHz. A 10 GHz cavity resonator (CP531 of Kanto Electronics Application & Development Inc.) is connected to a network analyzer ("E8363B" manufactured by Agilent Technology), and a measurement sample (width: 2.0 mm×length: 80 mm) is inserted into the cavity resonator, and the dielectric loss tangent of the measurement sample is measured based on a change in resonance frequency for 96 hours before and after the insertion in an environment of a temperature of 25° C. and a humidity of 60% RH.

The polymer film according to the embodiment of the present disclosure may contain an additive other than the polymer and the filler.

Known additives can be used as other additives. Specific examples of the other additives include a leveling agent, an antifoaming agent, an antioxidant, an ultraviolet absorbing agent, a flame retardant, and a colorant.

In the polymer film according to the embodiment of the present disclosure, all of the at least two phases have an elastic modulus of 0.01 GPa or more. From the viewpoint of improving the toughness, at least one phase of the at least two phases has an elastic modulus of preferably 0.1 GPa or more, more preferably 1 GPa or more, and still more preferably 5 GPa or more. In addition, from the viewpoint of improving the toughness, all of the at least two phases have an elastic modulus of preferably 0.1 GPa or more, more preferably 1 GPa or more, and still more preferably 5 GPa or more. The upper limit value of the elastic modulus is not particularly limited, but from the viewpoint of brittleness, it is preferably 10 GPa.

The elastic modulus in each phase is measured by the following method.

Using a scanning probe microscope (product name "SPA400", manufactured by Hitachi High-Tech Science Corporation), a film cross-section sample produced by cutting the film surface with a microtome is observed in a VE-AFM mode to determine storage elastic modulus of each phase. The elastic modulus is measured at 25° C.

A thermal conductivity of the polymer film according to the embodiment of the present disclosure is preferably 1 W/(m·K) or more, and more preferably 3 W/(m·K) or more. The upper limit value of the thermal conductivity is not particularly limited, but is, for example, 20 W/(m·K).

The thermal conductivity is measured by the following method.

A thermal conductivity measuring device (product name "TCM-1000", manufactured by RHESCA CO., LTD.) is used to measure the thermal conductivity in a thickness direction.

From the viewpoint of strength, an average thickness of the polymer film according to the embodiment of the present disclosure is preferably 6 µm to 200 µm, more preferably 12 µm to 100 µm, and particularly preferably 20 µm to 60 µm.

The average thickness of the polymer film is measured at optional five sites using an adhesive film thickness meter, for example, an electronic micrometer (product name "KG3001A", manufactured by Anritsu Corporation), and the average value of the measured values is defined as the average thickness of the polymer film.

From the viewpoint of dielectric constant, a dielectric loss tangent of the polymer film according to the embodiment of the present disclosure is preferably 0.005 or less, and more preferably more than 0 and 0.003 or less.

<Method of Manufacturing Polymer Film>

A method of manufacturing the polymer film according to the embodiment of the present disclosure includes, for example, the following steps.

(1) step of casting a first solution obtained by dissolving a first polymer and a compound incompatible with the first polymer in a solvent onto a support to form a film A (casting step)

(2) step of immersing the film A in a coagulation bath to form a film B (immersing step)

(3) step of eluting the compound incompatible with the first polymer from the film B to produce a porous film (eluting step)

(4) step of baking the porous film (baking step)

(5) step of impregnating a second solution containing a second polymer with the porous film after the baking (impregnating step)

At least one of the first solution or the second solution contains the filler.

—Casting Step—

The casting step is a step of casting a first solution obtained by dissolving a first polymer and a compound incompatible with the first polymer in a solvent onto a support to form a film A.

A casting method in the casting step is not particularly limited, and a known casting method can be used.

A casting temperature and a casting rate are not particularly limited, and may be determined with reference to a known casting method and composition of the solution to be used.

An average thickness of the film A is not particularly limited and may be a desired thickness, but is preferably 0.1 μm to 10 mm, more preferably 1 μm to 5 mm, still more preferably 10 μm to 1,000 μm, and particularly preferably 50 μm to 500 μm.

Examples of the support include a metal drum, a metal band, a glass plate, a resin film, and a metal foil. Among these, the support is preferably a glass plate or a resin film.

The first polymer is a polymer contained in one phase of the at least two phases in the above-described polymer film.

The compound incompatible with the first polymer is not particularly limited as long as it is a compound which can be in a phase-separated state in a case where the film A is formed, but from the viewpoint of ease of elution, the compound incompatible with the first polymer is preferably water-soluble.

The "water-soluble" in the present disclosure means that 0.1 g or more can be dissolved in 100 g of water at 25° C.

The compound incompatible with the first polymer may be a low-molecular-weight compound having a molecular weight of less than 1,000, or may be a polymer compound having a weight-average molecular weight Mw of 1,000 or more, but from the viewpoint of hole formation and ease of elution, the polymer compound having a weight-average molecular weight Mw of 1,000 or more is preferable, and a water-soluble resin is more preferable.

Examples of the water-soluble resin include polyvinyl alcohol, polyacrylamide, polyvinylpyrrolidone, poly(N-vinylacetamide), water-soluble polyester, and water-soluble polyurethane. Among these, the compound incompatible with the first polymer is preferably polyvinylpyrrolidone.

The solvent is not particularly limited as long as it is a solvent capable of dissolving the first polymer and the compound incompatible with the first polymer.

<Immersing Step>

The immersing step is a step of immersing the film A in a coagulation bath to form a film B.

A component of the coagulation bath is not particularly limited, but from the viewpoint of solidification and thermal conductivity, water, a polar solvent, or a mixed solvent of water and a polar solvent is preferable; water or a mixed solvent of water and a polar solvent is more preferable; and water is particularly preferable.

Examples of the polar solvent used in the coagulation bath include dioxane, tetrahydrofuran, dimethylformamide, dimethylacetamide, N-methylpyrrolidone, cellosolves, methanol, ethanol, propanol, acetone, polyethylene glycol, and glycerin.

From the viewpoint of solidification, a temperature of the coagulation bath is preferably 0° C. to 50° C., more preferably 10° C. to 35° C., and particularly preferably 20° C. to 30° C.

An immersion time is not particularly limited, and may be appropriately selected.

The method of manufacturing the polymer film according to the embodiment of the present disclosure preferably includes, after the casting step and before the immersing step, a step of applying a gas to the film A. By adjusting a time of applying the gas, it is possible to adjust the average hole diameter on a side (also referred to as an air side) of the obtained porous film opposite to the support.

The gas is not particularly limited, but is preferably air.

In addition, a temperature of the above-described gas is preferably 0° C. to 50° C., more preferably 10° C. to 35° C., and particularly preferably 20° C. to 30° C. A relative humidity of the above-described gas is preferably 30% to 90%, more preferably 35% to 80%, and particularly preferably 40% to 70%.

A time for applying the above-described gas is not particularly limited, and may be selected so as to obtain the desired average hole diameter.

In addition, the method of manufacturing the polymer film according to the embodiment of the present disclosure preferably includes, during the immersing step or after the immersing step, a step of peeling off the film B from the support.

The peeling may be performed in the coagulation bath or outside the coagulation bath.

The peeling method is not particularly limited, and a known peeling method can be used.

A temperature at the peeling is not particularly limited, but is preferably 0° C. to 50° C.

A peeling rate is not particularly limited, and can be appropriately selected.

<Eluting Step>

The eluting step is a step of eluting the compound incompatible with the first polymer from the film B to produce a porous film.

As the elution method in the eluting step, a method of bringing the film B into contact with an eluent is preferable, and a method of immersing the film B in an eluent is more preferable.

The eluent may be a compound which does not dissolve the first polymer at a certain temperature but dissolves the compound incompatible with the first polymer at the certain temperature, but from the viewpoint of selective dissolution, a water-soluble solvent is preferable.

Examples of the water-soluble solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, 4-methyl-1,2-pentanediol, and the like), and polyalkylene glycol (for example, diethylene glycol, triethylene glycol, tetraethylene glycol, pentaethylene glycol, dipropylene glycol, polyoxyethylene polyoxypropylene glycol, and the like); and polyhydric alcohol ether such as polyalkylene glycol ether (for example, diethylene glycol monoalkyl ether, triethylene glycol monoalkyl ether, tripropylene glycol monoalkyl ether, polyoxypropylene glyceryl ether, and the like).

Among these, from the viewpoint of selective elution, the water-soluble solvent is preferably a polyhydric alcohol or a polyhydric alcohol ether, more preferably a polyhydric alcohol, still more preferably polyalkylene glycol, and particularly preferably diethylene glycol.

An elution temperature in the eluting step depends on the solubility of the above-described first polymer and the like, and a boiling point and melting point of the eluent to be used, but is preferably 20° C. to 150° C., more preferably 50° C. to 100° C., and particularly preferably 60° C. to 90° C.

An elution time in the eluting step is not particularly limited, but is preferably 0.1 minutes to 24 hours, more preferably 0.5 minutes to 60 minutes, and particularly preferably 1 minute to 10 minutes.

The method of manufacturing the polymer film according to the embodiment of the present disclosure preferably includes, after the eluting step, a step of washing the porous film.

In addition, the method of manufacturing the polymer film according to the embodiment of the present disclosure preferably includes, after the eluting step or after the step of washing the porous film, a step of drying the porous film.

A washing solution used in the washing is not particularly limited, but water, a polar solvent, or a mixed solvent of water and a polar solvent is preferable; water or a mixed solvent of water and a polar solvent is more preferable; and water is particularly preferable.

A washing temperature and washing time are not particularly limited, and can be appropriately selected.

In addition, a washing unit is not particularly limited, and a known washing unit can be used.

A drying temperature and drying time are not particularly limited, and can be appropriately selected.

In addition, a drying unit is not particularly limited, and a known drying unit can be used.
(Baking Step)

The baking step is a step of baking the porous film.

A baking temperature is not particularly limited, but is preferably 200° C. to 400° C. and more preferably 250° C. to 300° C.

A baking time is not particularly limited, but is preferably 0.1 hours to 5 hours and more preferably 2 hours to 4 hours.

The baking is preferably carried out in an inert gas atmosphere. Examples of the inert gas include nitrogen.
(Impregnating Step)

The impregnating step is a step of impregnating a second solution containing a second polymer with the porous film after the baking.

The second polymer is a polymer contained in one phase of the at least two phases in the above-described polymer film.

The second solution may contain a solvent. The solvent is preferably a polar solvent. Examples of the polar solvent include dioxane, tetrahydrofuran, dimethylformamide, dimethylacetamide, N-methylpyrrolidone, cellosolves, methanol, ethanol, propanol, acetone, polyethylene glycol, and glycerin. Among these, the solvent is preferably N-methylpyrrolidone.

In addition, the method for manufacturing the polymer film according to the embodiment of the present disclosure preferably includes, after the impregnating step, a step of drying the obtained polymer film.

A drying temperature and drying time are not particularly limited, and can be appropriately selected.

In addition, a drying unit is not particularly limited, and a known drying unit can be used.

In the impregnating step, the second polymer penetrates into holes formed in the porous film, thereby obtaining a polymer film containing the first polymer and the second polymer.

In addition, since at least one of the first solution or the second solution contains the filler, a polymer film containing the filler is obtained.
—Use—

The polymer film according to the embodiment of the present disclosure can be used for various purposes. Among the various purposes, the polymer film according to the embodiment of the present disclosure can be used suitably for a film for an electronic component such as a printed wiring board and more suitably for a flexible printed circuit board.

In addition, the polymer film according to the embodiment of the present disclosure can be suitably used as a polymer film for metal adhesion.
[Laminate]

It is sufficient that the laminate according to the embodiment of the present disclosure is a laminate including the polymer film according to the embodiment of the present disclosure. The laminate according to the embodiment of the present disclosure preferably includes the polymer film according to the embodiment of the present disclosure, and a layer disposed on at least one surface of the polymer film. The layer disposed on at least one surface of the above-described polymer film is not particularly limited, and examples thereof include a polymer layer and a metal layer. The layer disposed on at least one surface of the polymer film may be a coating layer.

In addition, the layer disposed on at least one surface of the polymer film may be disposed on the entire surface of the polymer film, or may be disposed only on a part of the polymer film.

Among these, the laminate according to the embodiment of the present disclosure preferably includes the polymer film according to the embodiment of the present disclosure, and a metal layer or a metal wire, disposed on at least one surface of the polymer film.

In addition, the metal layer or the metal wire described above may be a known metal layer or metal wire, but is, for example, preferably a copper layer or a copper wire.

A method of attaching the polymer film according to the embodiment of the present disclosure to the metal layer is not particularly limited, and a known laminating method can be used.

A peel strength between the above-described polymer film and the above-described metal layer is preferably 0.5 kN/m or more, more preferably 0.7 kN/m or more, still more preferably 0.7 kN/m to 2.0 kN/m, and particularly preferably 0.9 kN/m to 1.5 kN/m.

In the present disclosure, the peel strength between the polymer film and the metal layer (for example, the copper layer) is measured by the following method.

A peeling test piece with a width of 1.0 cm is produced from the laminate of the polymer film and the metal layer, the polymer film is fixed to a flat plate with double-sided adhesive tape, and the strength (kN/m) in a case of peeling the polymer film off from the metal layer at a rate of 50 mm/min is measured by the 180° method in conformity with JIS C 5016 (1994).

The metal layer is preferably a copper layer. As the copper layer, a rolled copper foil formed by a rolling method or an electrolytic copper foil formed by an electrolytic method is preferable, and a rolled copper foil is more preferable from the viewpoint of bending resistance.

An average thickness of the metal layer, preferably the copper layer is not particularly limited, but is preferably 3 μm to 30 μm and more preferably 5 μm to 20 μm. The copper foil may be copper foil with a carrier formed on a support (carrier) so as to be peelable. As the carrier, a known carrier can be used. An average thickness of the carrier is not particularly limited, but is preferably 10 μm to 100 μm and more preferably 18 μm to 50 μm.

It is also preferable that the metal layer in the laminate according to the embodiment of the present disclosure is processed into, for example, a desired circuit pattern by etching to form a flexible printed circuit board. The etching method is not particularly limited, and a known etching method can be used.

EXAMPLES

Hereinafter, the present disclosure will be described in more detail with reference to examples. The materials, the used amounts, the proportions, the treatment contents, the treatment procedures, and the like described in the following examples can be appropriately changed without departing from the gist of the present disclosure. Therefore, the scope of the present disclosure is not limited to the following specific examples.

<<Measurement Method>>
[Breaking Elongation]

A film sample having a length of 200 mm (measurement direction) and a width of 10 mm was cut out. A distance between chucks was set to 100 mm. Using a universal tensile tester "STM T50BP" manufactured by Toyo Baldwin Co., Ltd., a breaking elongation was calculated by measuring until the sample broke at a tensile speed of 10%/min in an atmosphere of 25° C. and 60% RH.

[Elastic Modulus]

Using a scanning probe microscope (SPA400, manufactured by Hitachi High-Tech Science Corporation), a film cross-section sample produced by cutting the film surface with a microtome was observed in a VE-AFM mode to determine storage elastic modulus of each phase.

<Polymer Used for Producing Polymer Film>
  LC-A: Liquid crystal polymer produced by production method described below
  LC-B: Liquid crystal polymer produced by production method described below —Production of LC-A—

940.9 g (5.0 mol) of 6-hydroxy-2-naphthoic acid, 377.9 g (2.5 mol) of 4-hydroxyacetaminophen, 415.3 g (2.5 mol) of isophthalic acid, and 867.8 g (8.4 mol) of acetic acid anhydride were added to a reactor provided with a stirrer, a torque meter, a nitrogen gas introduction pipe, a thermometer, and a reflux condenser, the gas inside the reactor was replaced with nitrogen gas, and the mixture was heated from room temperature (23° C.) to 140° C. over 60 minutes while being stirred in a nitrogen gas stream and was refluxed at 140° C. for 3 hours.

Thereafter, the mixture was heated from 150° C. to 300° C. over 5 hours while distilling off by-product acetic acid and unreacted acetic acid anhydride and maintained at 300° C. for 30 minutes, and the resultant was taken out from the reactor and cooled to room temperature. The obtained solid matter was crushed with a crusher, thereby obtaining powdery liquid crystal polyester (B1). The flow start temperature of the liquid crystal polyester (B1) was 193.3° C.

The liquid crystal polyester (B1) obtained above was heated from room temperature to 160° C. over 2 hours and 20 minutes in a nitrogen atmosphere, further heated from 160° C. to 180° C. over 3 hours and 20 minutes, maintained at 180° C. for 5 hours to carry out solid phase polymerization, cooled, and crushed with a crusher, thereby obtaining powdery liquid crystal polyester (B2). The flow start temperature of the liquid crystal polyester (B2) was 220° C.

The liquid crystal polyester (B2) obtained above was heated from room temperature (23° C.) to 180° C. over 1 hour and 25 minutes in a nitrogen atmosphere, further heated from 180° C. to 255° C. over 6 hours and 40 minutes, maintained at 255° C. for 5 hours to carry out solid phase polymerization, and cooled, thereby obtaining powdery liquid crystal polyester (LC-A). A flow start temperature of the liquid crystal polyester (LC-A) was 302° C. In addition, in a case where a melting point of the liquid crystal polyester (LC-A) was measured using a differential scanning calorimetry device, the measured value was 311° C.

—Production of LC-B—

941 g (5.0 mol) of 6-hydroxy-2-naphthoic acid, 273 g (2.5 mol) of 4-aminophenol, 415 g (2.5 mol) of isophthalic acid, and 1123 g (11 mol) of acetic acid anhydride were added to a reactor provided with a stirrer, a torque meter, a nitrogen gas introduction pipe, a thermometer, and a reflux condenser, the gas inside the reactor was replaced with nitrogen gas, and the mixture was heated from room temperature (23° C.) to 150° C. over 15 minutes while being stirred in a nitrogen gas stream and was refluxed at 150° C. for 3 hours.

Thereafter, the mixture was heated from 150° C. to 320° C. over 3 hours while distilling off by-product acetic acid and unreacted acetic acid anhydride and maintained until an increase in viscosity was observed, and the resultant was taken out from the reactor and cooled to room temperature. The obtained solid matter was crushed with a crusher, thereby obtaining powdery liquid crystal polyester (B1).

The liquid crystal polyester (B1) obtained above was maintained at 250° C. for 3 hours in a nitrogen atmosphere to carry out solid phase polymerization, cooled, and crushed with a crusher, thereby obtaining powdery liquid crystal polyester (LC-B).

PVP-A: Polyvinylpyrrolidone (product name "PITZCOL K-50", manufactured by DKS Co., Ltd.) was used; PVP-A was a compound incompatible with LC-A at 0° C. to 100° C.
  PSU-A: Polysulfone (product name "Udel P-3500", manufactured by Solvay) was used; PSU-A was a compound compatible with LC-A at 0° C. to 100° C.
  SBR-A: Styrene-butadiene rubber (product name "P1430-SBR", manufactured by GENERAL SCIENCE CORPORATION)

<Filler Used for Producing Polymer Film>
  A-1: Low dielectric loss tangent filler having an average particle diameter of 600 nm (specially treated molten spherical silica, manufactured by Denka Company Limited, dielectric loss tangent: 0.0001)

B-1: Aluminum nitride particles (particle size 1 m-type, manufactured by Tokuyama Corporation)

C-1: Silica particles having an average particle diameter of 0.5 μm (product name "SO-C2", manufactured by Admatechs)

D-1: Hollow powder having an average particle diameter of 16 μm (product name "Glass bubbles iM30K", manufactured by 3M Japan Limited)

E-1: Boron nitride particles (product name "HP40MF100", manufactured by Mizushima Ferroalloy Co., Ltd.)

Examples 1 to 10

—Preparation of Polymer Solution—

LC-A and the filler shown in Table 1 were added to N-methylpyrrolidone, and the mixture was stirred at 140° C. for 4 hours in a nitrogen atmosphere, thereby obtaining a solution having a concentration of solid contents of 18% by mass. The addition amount of the filler was adjusted so as to be the addition amount shown in Table 1. In Example 1, Example 2, and Examples 7 to 10, no filler was added.

Next, 87 parts by mass of PVP-A, 7 parts by mass of lithium chloride, and 8 parts by mass of water with respect to 100 parts by mass of LC-A were added thereto and uniformly dissolved.

Subsequently, the solution was allowed to pass through a sintered fiber metal filter having a nominal pore diameter of 10 μm, and then allowed to pass through a sintered fiber filter having the same nominal pore diameter of 10 μm, thereby obtaining a polymer solution.

—Film Formation—

The polymer solution was cast onto a glass plate through a casting coater so as to have the thickness shown in Table 1 after drying (casting step). LC-A and PVP-A were phase-separated, and the liquid film had a co-continuous structure. Air in which a temperature was adjusted to 25° C. and a relative humidity was adjusted to 50% was applied to a surface of the cast liquid film at a wind speed of 1.2 m/sec. Thereafter, the glass plate on which the film was formed was immediately immersed in a coagulation bath filled with water at 25° C. (immersing step).

The obtained film was solidified and then peeled off from the glass plate in water. A washing treatment was carried out in diethylene glycol at 75° C. for 5 minutes to elute PVP-A (eluting step). Washing with water and drying were further carried out.

—Baking—

The film after the eluting step was heated in a nitrogen atmosphere of 280° C. for 3 hours to obtain a porous film (baking step).

—Impregnation—

PSU-A and the filler shown in Table 1 were added to N-methylpyrrolidone to prepare an impregnating solution having a concentration of solid contents of 15% by mass. The addition amount of the filler was adjusted so as to be the addition amount shown in Table 1. In Examples 3 to 5, no filler was added.

The impregnating solution was impregnated with the porous film (impregnating step). After the impregnation, the product was dried to obtain a polymer film.

In the polymer film, two phases were formed, each phase formed a continuous phase, and thus a co-continuous structure was formed. The phase containing LC-A was designated as a first phase, and the phase containing PSU-A was designated as a second phase.

—Laminating with Copper Foil—

The above-described polymer film was placed on a roughened surface side of a copper foil (product name "3EC-M1S-HTE", manufactured by MITSUI MINING & SMELTING CO., LTD., 12 μm). Using a laminator (product name "Vacuum laminator V-130", manufactured by Nikko-Materials Co., Ltd.), lamination was performed for 1 minute under conditions of 140° C. and a laminating pressure of 0.4 MPa. Subsequently, using a thermocompression machine (product name "MP-SNL", manufactured by Toyo Seiki Seisaku-sho, Ltd.), thermocompression was performed under conditions of 300° C. and 4.5 MPa for 10 minutes to obtain a laminate with the copper foil. It was confirmed that a peel strength between the polymer film and the copper foil of the obtained laminate was 0.5 kN/m or more.

Comparative Example 1

A polymer film was obtained in the same manner as in Example 3, except that the impregnating step was changed as follows.

—Impregnation—

SBR-A was added to chloroform and uniformly dissolved to prepare an impregnating solution having a concentration of solid contents of 15% by mass.

The impregnating solution was impregnated with the porous film (impregnating step). After the impregnation, the product was dried to obtain a polymer film.

Comparative Examples 2 and 3

—Preparation of Polymer Solution—

PSU-A and the filler shown in Table 1 were added to N-methylpyrrolidone to prepare a solution having a concentration of solid contents of 18% by mass. The addition amount of the filler was adjusted so as to be the addition amount shown in Table 1.

Subsequently, the solution was allowed to pass through a sintered fiber metal filter having a nominal pore diameter of 10 μm, and then allowed to pass through a sintered fiber filter having the same nominal pore diameter of 10 μm, thereby obtaining a polymer solution.

—Film Formation—

The polymer solution was cast onto a glass plate through a casting coater so as to have the thickness shown in Table 1, and then dried with hot air to obtain a polymer film.

The polymer films of Comparative Examples 2 and 3 did not have the phase-separated structure. Therefore, in Table 1, the data regarding the polymer and the filler contained in the polymer film are shown only in the first phase.

Table 1 shows the breaking elongation of the polymer films obtained in Examples and Comparative Examples. In addition, as a filler ratio, a value represented by a/b, in a case where a volume of the filler present in the first phase is a and a volume of the filler present in the second phase is b, is shown.

TABLE 1

| | First phase | | | | Second phase | | | | | |
|---|---|---|---|---|---|---|---|---|---|---|
| | | Filler | | | | Filler | | | | |
| | Polymer Type | Type | Addition amount (% by volume) | Elastic modulus (Gpa) | Polymer Type | Type | Addition amount (% by volume) | Elastic modulus (Gpa) | Filler ratio | Average thickness (μm) | Breaking elongation (%) |
| Example 1 | LC-A | — | — | 3 | PSU-A | A-1 | 60 | 6 | 0/100 | 50 | 10 |
| Example 2 | LC-A | — | — | 3 | PSU-A | B-1 | 60 | 6 | 0/100 | 100 | 10 |
| Example 3 | LC-A | B-1 | 60 | 7 | PSU-A | — | — | 2 | 100/0 | 100 | 9 |
| Example 4 | LC-A | B-1 | 20 | 4 | PSU-A | — | — | 2 | 100/0 | 100 | 26 |
| Example 5 | LC-A | B-1 | 15 | 4 | PSU-A | — | — | 2 | 100/0 | 100 | 30 |
| Example 6 | LC-A | A-1 | 30 | 5 | PSU-A | A-1 | 30 | 4 | 50/50 | 50 | 5 |
| Example 7 | LC-A | — | — | 3 | PSU-A | A-1 | 20 | 3 | 0/100 | 50 | 15 |
| Example 8 | LC-B | — | — | 3 | PSU-A | C-1 | 60 | 6 | 0/100 | 100 | 10 |
| Example 9 | LC-B | — | — | 3 | PSU-A | D-1 | 60 | 6 | 0/100 | 100 | 8 |
| Example 10 | LC-B | — | — | 3 | PSU-A | E-1 | 30 | 5 | 0/100 | 100 | 18 |
| Comparative Example 1 | LC-A | B-1 | 60 | 7 | SBR-A | — | — | 0.001 | 100/0 | 50 | <1 |
| Comparative Example 2 | PSU-A | B-1 | 60 | 6 | — | — | — | — | — | 100 | <1 |
| Comparative Example 3 | PSU-A | B-1 | 35 | 4 | — | — | — | — | — | 100 | 4 |

As shown in Table 1, in Examples 1 to 10, since the polymer film contained a polymer and a filler, in which the polymer film had a phase-separated structure including at least two phases, and all of the at least two phases have an elastic modulus of 0.01 GPa or more, it was found that the breaking elongation of the polymer film was large and the toughness was high. In addition, each thermal conductivity of the polymer films of Examples 3, 4, and 5 was 4 W/(m·K), 2 W/(m·K), and 0.5 W/(m·K).

On the other hand, in Comparative Example 1, the elastic modulus of the second phase was less than 0.01 GPa, and it was found that the breaking elongation was small.

In Comparative Examples 2 and 3, since the polymer film did not have the phase-separated structure, it was found that the breaking elongation was small.

The disclosure of Japanese Patent Application No. 2021-047289 filed on Mar. 22, 2021 is incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. A polymer film comprising:
a polymer; and
a filler,
wherein the polymer film has a phase-separated structure comprising at least two phases, and
all of the at least two phases have an elastic modulus of 0.01 GPa or more,
wherein an average primary particle diameter of the filler is 0.0130 μm to 30 μm.

2. The polymer film according to claim 1,
wherein the phase-separated structure is a co-continuous structure, a cylinder structure, or a lamella structure.

3. The polymer film according to claim 1,
wherein the phase-separated structure comprises two phases, and
in a case where a volume of a filler present in one phase is a and a volume of a filler present in the other phase is b, a/b, which is an abundance ratio of the fillers, is 100/0 to 60/40.

4. The polymer film according to claim 1,
wherein a content of a filler comprised in any of the at least two phases is 20% by volume or more with respect to a total volume of the phase.

5. The polymer film according to claim 1,
wherein at least one phase of the at least two phases has an elastic modulus of 0.1 GPa or more.

6. The polymer film according to claim 1,
wherein the polymer comprises at least one selected from the group consisting of a liquid crystal polymer and polysulfone.

7. The polymer film according to claim 6,
wherein the liquid crystal polymer comprises a constitutional unit represented by any of Formulae (1) to (3),

  Formula (1)

  Formula (2)

  Formula (3)

in Formulae (1) to (3), Ar1 represents a phenylene group, a naphthylene group, or a biphenylylene group, Ar2 and Ar3 each independently represent a phenylene group, a naphthylene group, a biphenylylene group, or a group represented by Formula (4), X and Y each independently represent an oxygen atom or an imino group, and hydrogen atoms in the group represented by Ar1 to Ar3 may be each independently substituted with a halogen atom, an alkyl group, or an aryl group,

  Formula (4)

in Formula (4), Ar4 and Ar5 each independently represent a phenylene group or a naphthylene group, and Z represents an oxygen atom, a sulfur atom, a carbonyl group, a sulfonyl group, or an alkylene group.

8. The polymer film according to claim 1,
wherein a thermal conductivity is 1 W/(m·K) or more.

9. The polymer film according to claim 1,
wherein the filler is at least one selected from the group consisting of boron nitride, aluminum nitride, graphite, silicon carbide, silica, alumina, and beryllium oxide.

10. The polymer film according to claim 1,
wherein the filler has a dielectric loss tangent of 0.01 or less.

11. The polymer film according to claim 10,
wherein the filler is liquid crystal polymer particles, fluororesin particles, or an inorganic material.

12. The polymer film according to claim 11,
wherein the inorganic material comprises metal oxide particles.

13. The polymer film according to claim 11,
wherein the inorganic material comprises fiber.

14. The polymer film according to claim 1,
wherein at least one phase of the at least two phases comprises a polymer having a dielectric loss tangent of 0.01 or less.

15. A laminate comprising:
the polymer film according to claim 1; and
a metal layer or a metal wire, disposed on at least one surface of the polymer film.

16. The laminate according to claim 15,
wherein the laminate comprises the metal layer, and
a peel strength between the polymer film and the metal layer is 0.5 kN/m or more.

\* \* \* \* \*